United States Patent [19]

Ravela

[11] Patent Number: 4,585,406
[45] Date of Patent: Apr. 29, 1986

[54] APPARATUS FOR PROVIDING A FIBRE WITH AN ADDITIONAL LENGTH IN SECONDARY MANTLING OF AN OPTICAL FIBRE

[75] Inventor: Jussi T. Ravela, Espoo, Finland
[73] Assignee: Oy Nokia AB, Helsinki, Finland
[21] Appl. No.: 615,314
[22] Filed: May 30, 1984
[30] Foreign Application Priority Data
 May 30, 1983 [FI] Finland .................. 831928
[51] Int. Cl.$^4$ .................. B29C 47/34; B29C 55/22; G02B 6/00
[52] U.S. Cl. .................. 425/113; 264/1.5; 264/173; 264/209.3; 425/392
[58] Field of Search ............. 264/1.5, 230, 173, 209.3; 425/113, 392; 350/96.23, 96.34

[56] References Cited

U.S. PATENT DOCUMENTS

| | | | |
|---|---|---|---|
| 4,154,783 | 5/1979 | Jackson | 264/1.5 |
| 4,414,165 | 11/1983 | Oestreich et al. | 264/1.5 |
| 4,446,686 | 5/1984 | Panuska et al. | 350/96.23 |
| 4,458,476 | 7/1984 | Mayr et al. | 264/173 |

FOREIGN PATENT DOCUMENTS 2533688 9/1982 France .

Primary Examiner—James Lowe
Attorney, Agent, or Firm—Fitch, Even, Tabin & Flannery

[57] ABSTRACT

A method for providing a fibre with an additional length in secondary mantling of an optical fibre, according to which an optical fibre is coated by means of extrusion (3) with a secondary mantle allowing an axial movement between the fibre and the mantle, the mantled fibre (6) is drawn (10) axially forwards after the coating, the mantle is stretched (11) axially with respect to the fibre, and the elongation of the mantle is allowed to relax (12) together with the fibre so that the fibre is longer than the mantle in the relaxed mantled fibre, after which the relaxed mantled fibre is winded on a coil (13). The fibre and mantle are locked (11) axially stationary to each other during the advancing of the mantled fibre (6) before the relaxation of the elongation of the mantle, and the mantle is subjected to a retardation (10) during the advancing of the mantled fibre for stretching the mantle with respect to the fibre before locking of the fibre and mantle. The retardation and locking are carried out positively synchronized with each other so that the stretching provides after the relaxation a desired additional length in the fibre with respect to the mantle.

1 Claim, 6 Drawing Figures

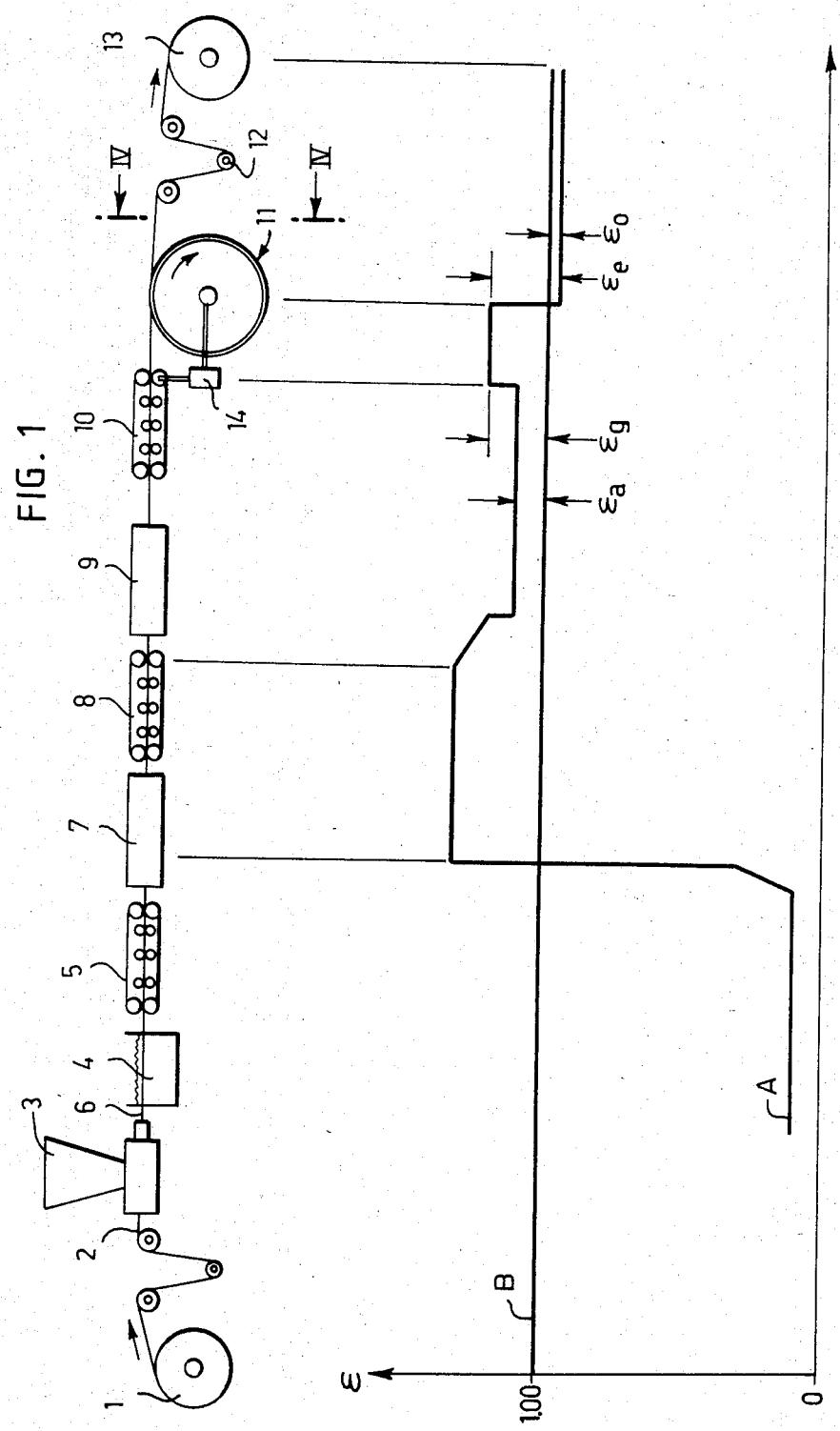

APPARATUS FOR PROVIDING A FIBRE WITH AN ADDITIONAL LENGTH IN SECONDARY MANTLING OF AN OPTICAL FIBRE

The present invention relates to a method for providing a fibre with an additional length in secondary mantling of an optical fibre, according to which method an optical fibre coated with a primary mantle is coated by means of extrusion with a secondary mantle or sheath allowing a mutual axial movement between the fibre and the secondary mantle, the mantled fibre is drawn axially forwards after said coating, the secondary mantle is stretched axially with respect to the fibre, the elongation of the secondary mantle is allowed to relax together with the fibre so that the fibre is longer than the secondary mantle in the relaxed mantled fibre, and the relaxed mantled fibre is winded on a coil.

In GB Patent Specification No. 1,538,853 a method is described for providing an optical fibre with a so-called loose secondary mantle by extruding a mantle of polymer around a fibre coated with a primary mantle and by orientating the polymer mantle in a furnace. Furthermore the mantle is heated and allowed to relax in order to obtain heat stability.

The main object of a loose mantling of an optical fibre is to isolate the fibre from all mechanical strains and tensions. According to said patent specification the fibre and the secondary mantle are made equally long, but the secondary mantle so loose that, if the mantle shrinks in the longitudinal direction, the fibre can bend within the mantle with such a long radius of curvature that it does not essentially effect the qualities of the fibre. When the mantle during the later cable manufacturing stages and possibly also in a finished cable is subjected to changes in forces and temperatures, a stretching of the mantle, however, causes a damaging tensile stress in the fibre. Because of a low initial tension of the fibre and of a small inner friction in the mantle, the fibre furthermore tends, when it is winded on a coil in connection with manufacturing, to be positioned inside the mantle on its inner periphery, i.e. on the inner side of the neutral axis of the mantle. Therefore, when the mantle is straightened, e.g. in connection with twisting, the fibre is shorter than the length of the neutral axis of the mantle because of which the fibre is subjected to tensile stress and the dampening effect of the fibre increases.

In order to avoid this disadvantage, it has been observed that it is advantageous to provide the fibre with a small additional length with respect to the mantle, so that the fibre is not stretched even if the mantle stretches a little. However, as the inner diameter of the mantle is limited and a plastic mantle shrinks in low temperatures, the additional length of the fibre must not either be too big, so that the fibre is not subjected to compression stress when the mantle shrinks. It has been proved that an additional length of about 0.03% of the fibre length is the optimum when the mantle is straight and that the additional length must be below 0.1%.

Because plastic material always shrinks in connection with extrusion moulding as a consequence of cooling and heat tension, it has earlier been proposed to provide the fibre with an additional length by adjusting the shrinking of the mantle beginning at a certain point of the mantle by means of heat relaxation. The control and measuring of sufficiently small shrinkings are, however, difficult and if there is initial tension in the fibre, e.g. as a consequence of a grease filling, the determination of a sufficient shrinking may be difficult.

It has also earlier been proposed to provide the fibre with an additional length by stretching the mantle with a known force by means of a so-called torque actuator according to which the receiving coil on which the secondary mantled fibre is winded in connection with the production is subjected to a predetermined torque in order to stretch the mantle. However, this requires knowledge of the exact modulus of elasticity of the mantle which is not always easy to establish with plastics. Further, it is not clear when using a grease-filled mantle which part of the tension relates to the fibre and decreases the elongation. Furthermore, it is necessary to wind open the receiving coil in order to allow the elongation obtained in this way in the mantle to relax (shrink) to the final length before the use of the mantled fibre.

The object of this invention is to obtain a method of providing a fibre with an additional length which avoids said drawbacks and enables a simpler and more reliable provision of an additional length for the fibre. This object is achieved by the method according to the invention which is characterized in that the fibre and the secondary mantle are locked axially stationary to each other during the advancing of the mantled fibre before the relaxation of the elongation of the secondary mantle, the secondary mantle is subjected to a retardation during the advancing of mantled fibre for stretching of the secondary mantle with respect to the fibre before said locking of the fibre and mantle, and said retardation and locking are carried out positively synchronized with each other so that said stretching provides after said relaxation a desired additional length ($\epsilon_o$) in the fibre with respect to the secondary mantle.

The invention is based on the idea that the locking of the mantled fibre continuously advancing from the extrusion moulding and relaxing stages and the retardation of the mantle are positively coupled to each other so that said locking and retardation are carried out with a small speed difference.

Because the modulus of elasticity and the yield point of an oriented polymer are relatively high and fairly accurately determinable, the mantle can after cooling be stretched by several tenths of a percent and thereafter be allowed to relax back to its original length. If according to the invention a locking point is positioned on the mantling line and a retardation point is positioned before the locking point, the mantle can be provided with such a tension and elongation that the fibre is provided with a desired additional length with respect to the mantle when the elongation of the mantle relaxes after the locking point and the mantled fibre is winded with low tension on a receiving coil which prevents the fibre from moving with respect to the mantle and thereby the additional length of the fibre from disappearing.

BRIEF DESCRIPTION OF THE DRAWINGS

The invention is explained in more detail in the following with reference to the enclosed drawings, wherein FIG. 1 is a schematic view of a secondary mantling line for an optical fibre in which the method according to the invention has been utilized, FIG. 2 is a graphical view of the relative elongation of a secondary mantle in different mantling stages.

DETAILED DESCRIPTION OF THE INVENTION

Figure 3:
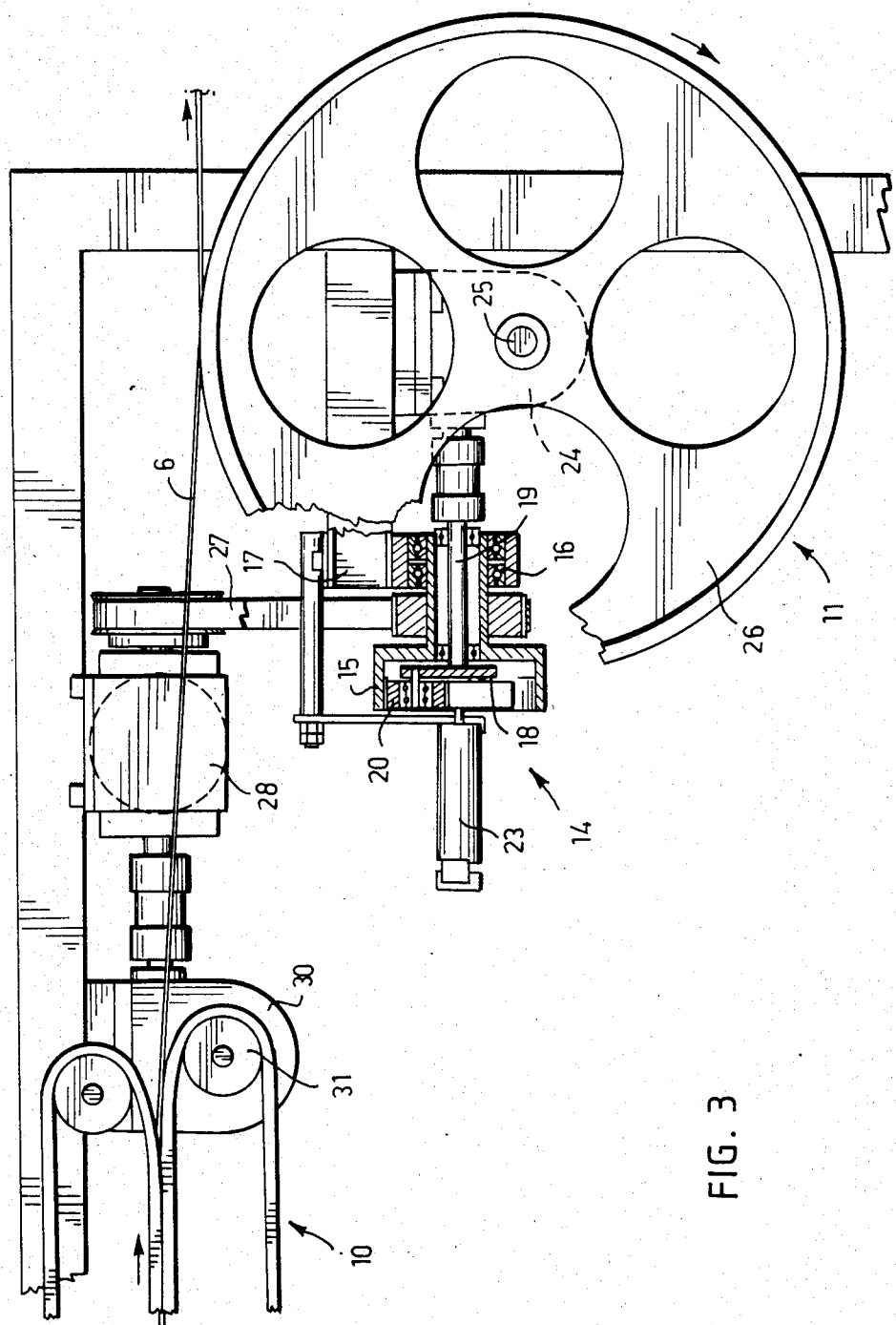
FIGS. 3 and 4 are views on a larger scale of a stretching apparatus according to the invention seen from the side and correspondingly in the direction of the mantling line along line IV—IV in FIG. 1.

In FIG. 1 of the drawings a starting coil 1 is shown, from which a primary mantled optical fibre 2 is passed through an extruder 3 and a cooling device 4 by means of a first drawing device. The extruder extrudes a loose secondary mantle or sheath around the fibre, which mantle is cooled in the cooling device. The mantled fibre 6 continues through a first furnace 7 operated by a second drawing device 8 and further through a second furnace 9 by means of a third drawing device 10, in which furnaces a heat relaxation of the mantle occurs. From the third drawing device the mantled fibre passes through a stretching apparatus 11 and an accumulator 12 to a receiving coil 13.

Curve A shown in FIG. 2 illustrates the relative elongation $\epsilon$ of the secondary mantle with respect to the fibre which is indicated by a straight line B. The secondary mantle surrounds the fibre loosely in all processing stages and the fibre is moved essentially free from tension from the starting coil to the receiving coil by means of the drawing device 11. Said drawing devices 5, 8, 10 affect only the secondary mantle. From the diagram appears that the secondary mantle shrinks due to cooling with respect to the fibre, but elongates a little with respect to the fibre during the heating treatment. If the mantled fibre treated in this way were after this winded directly on the receiving coil, the mantle would be longer than the fibre by the amount $\epsilon_a$.

According to the invention the mantle is subjected to stretching before the mantled fibre is winded on the receiving coil. This is obtained by means of a third drawing device 10 and a stretching device 11, which are positively coupled to each other by means of a mechanical actuator 14 mounted between them. By means of the actuator a small speed difference is provided between the drawing device and the stretching device so that the drawing device tries to retard the mantle with respect to the drawing action of the stretching device. A locking of the fibre axially stationary to the mantle in order to prevent the fibre from sliding with respect to the mantle is obtained in the stretching device in a manner explained below. Such a stretching provides a pre-elongation $\epsilon_e$ in the mantle. After the mantle leaves the stretching device, the pre-elongation of the mantle can relax before the winding on the receiving coil. Because the receiving coil prevents the mantle and the fibre from moving axially with respect to each other, the relaxation of the pre-elongation, i.e., the shrinking of the mantle, results in the mantle remaining shorter than the fibre by the amount $\epsilon_o$. By choosing a pre-elongation of a suitable size in a manner explained below, the fibre receives the desired additional length $\epsilon_o$ with respect to the mantle.

Figure 4:
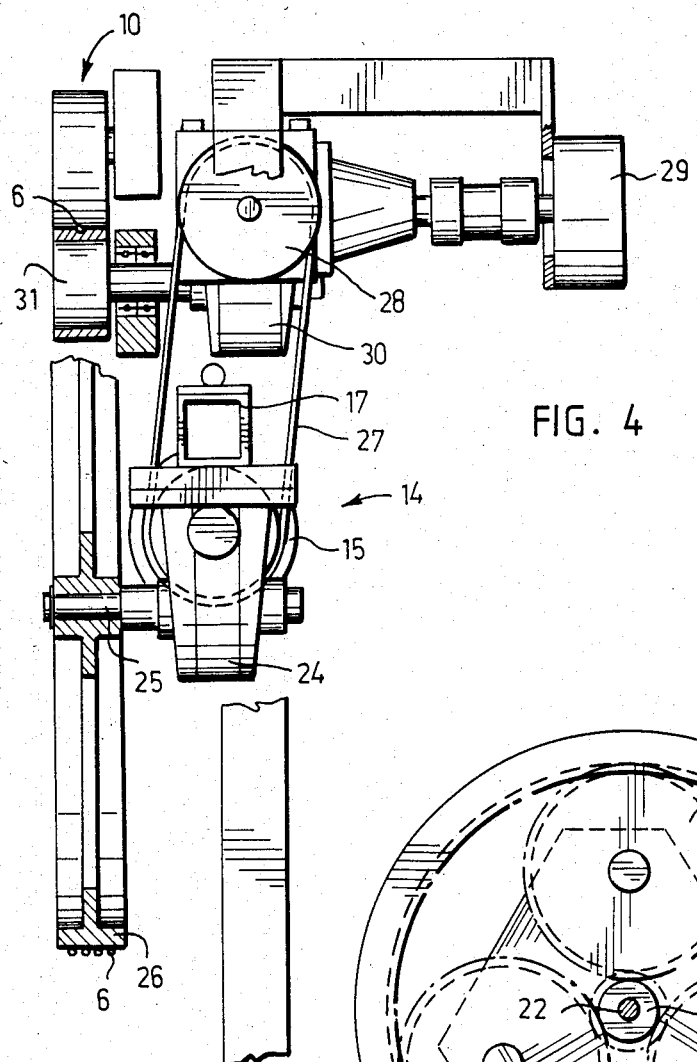
Figure 5:
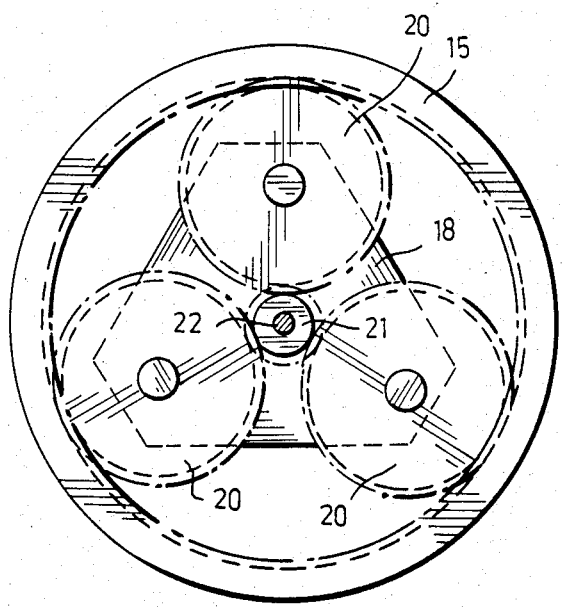
FIG. 5 is a view on a larger scale of the planetary wheel of the apparatus.

The actuator 14 according to FIGS. 3 to 5 comprises a planetary gear including a ring gear or tooth rim 15 having a bearing shaft 16 pivoted in a stationary body 17, and a planetary carrier 18 having a shaft 19 pivoted co-axially inside the bearing shaft 16. On said carrier there are pivoted three planetary wheels 20 as well as a centrally positioned small sun wheel 21, FIG. 5, which is in engagement with the planetary wheels. The shaft 22 of the sun wheel is connected to a D/C electric motor 23 with low speed.

The shaft 19 of the planetary carrier is coupled to a stretch wheel 26 fastened to a shaft 25 by means of a spiral gear 24 fastened to the body and having a big transmission ratio. The bearing shaft 16 of the tooth rim is coupled by means of a tooth belt 27 to an actuator 28 operated by a motor 29. This actuator is coupled to a drive wheel 31 of the drawing device 10 supported by the body through a spiral gear 30 having a small transmission ratio with respect to said spiral gear 24. The drawing device is of a double belt type as shown in FIG. 3.

The rotation speed of the motor 29 is transmitted by means of the belt 27 to the tooth rim 15 and therefrom slightly decreased to the shaft 19 of the planetary carrier which rotates the stretch wheel 26. When the sun wheel 21 is rotated by the electric motor 23 at a low speed as regards the speed of the planetary carrier in the same direction, the drive gear is provided with a small additional speed as regards the speed of the drive gear 31 of the drawing device 10. The micro motor driving the sun wheel has a big transmission ratio and is independently adjustable. By adjusting the motor either with a direct speed control or with a control signal obtained from the tension of the mantle by means of a tension indicator positioned between the drive gear 26 and the belt drawing device 10, a desired pre-elongation is obtained in the mantle with an accuracy of about 0.01%.

The mantled fibre 6 is winded around the stretch wheel 26 so many times that the fibre inside the mantle cannot slip axially with respect to the mantle despite the initial tension in the fibre. The retarding drawing device 10 is of belt type and does not therefore provide the fibre with any extra tension.

The small speed difference provided by the planetary wheel system causes a stretching of the mantle, which provides the mantle with said pre-elongation $\epsilon_e$ which after relaxation causes the desired additional length $\epsilon_o$ in the fibre when the mantled fibre is winded on the receiving coil with low tension.

In order to obtain the desired pre-elongation, the diameters of the mantle and the fibre, the diameter of the stretch wheel 26 as well as the possible elongation of the fibre before the stretching device must be known. If said values are known, the size of the pre-elongation is:

$$\epsilon_e = 100 \left[ \frac{D + d_v}{D + (2 \times s_v) + d_k} - 1 \right] + \epsilon_k + \epsilon_o \, [\%]$$

wherein
D = the diameter of the stretch wheel [mm]
$d_v$ = the diameter of the secondary mantle [mm]
$s_v$ = the thickness of the mantle wall [mm]
$d_k$ = the diameter of the fibre [mm]
$\epsilon_k$ = the elongation of the fibre before pre-elongation [%]
$\epsilon_o$ = the desired additional length of the fibre [%]

Figure 6:
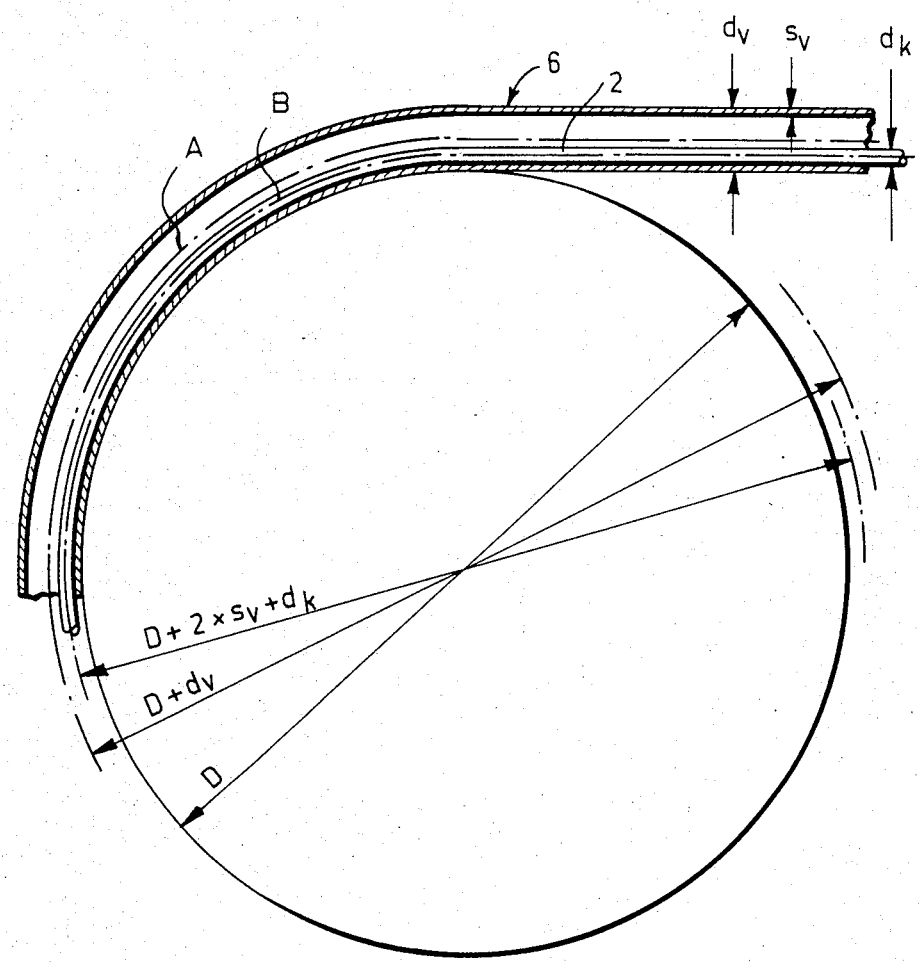
FIG. 6 is an axial sectional view of the stretch wheel of the apparatus and the secondary mantled fibre.

With respect to the different factors in the formula, reference is made fo FIG. 6.

If the fibre is enclosed in an unfilled mantle and the fibre is made slippery with, e.g., talcum, the factor $\epsilon_k$ is generally not needed to be taken into consideration because of its smallness.

If it is desirable to have a fairly high initial tension in the fibre, this causes an elongation $\epsilon_k$ which must be compensated. Typically, a force of about 0.9 Newton stretches the fibre by 0.1%. A grease filling causes the fibre an elongation which can be determined in two ways:

Passing time measuring method:

The length of a fibre can be measured with great accuracy (about 0.01%) on the basis of the time which light requires for passing from one end to the other of the fibre. Then length of the fibre is measured in a condition in which the fibre is as free as possible from tension before mantling. The fibre is enclosed in a grease-filled mantle without compensating any factor, i.e. without pre-elongation. The length of the mantled fibre is measured. The elongation resulting from the mantling is the factor $\epsilon_k$, supposing that the measuring wheel is as big as the elongation wheel.

Stretch measuring (expanding wheel measuring):

If a so-called expanding measuring wheel can be used, i.e. a wheel having a periphery which can be controllably expanded and returned to initial size e.g., by means of pressure air in a small degree (about 0 to 0.5%), the mantled fibre is winded thereon with a low tension after the mantle has been pre-stretched to an arbitrary, rather big degree, e.g. 0.5%. The fibre is connected to said time passing measuring process and the periphery of the wheel is expanded gradually. If the fibre has obtained an additional length in the pre-stretching, in the beginning only the mantle is stretched when the periphery of the wheel expands, and the measuring does not show any increase of the length of the fibre. The stretching of the mantle is continued until the fibre shows marks of stretching. A corresponding elongation $\epsilon'$ of the mantle is registered. The elongation of the fibre due to the grease filling can now be calculated from the formula $\epsilon_k = \epsilon - \epsilon'$ if the periphery of the measuring wheel is as big as that of the stretch wheel. The obtained value $\epsilon_k$ is used in order to calculate the correct stretching also for other dimensions of the mantle and the fibre.

The sufficient number of turns of the mantled fibre around the stretch wheel can be determined experimentally so that a short length of a mantled fibre (with or without a grease filling) is winded around the stretch wheel and one end of the fibre is drawn with a force which corresponds to the elongation $\epsilon_k$. The mantled fibre is winded at least so many turns that the fibre does not slip with respect to the mantle subjecting the fibre to this force.

The drawings and the description relating thereto are only intended to illustrate the idea of the invention. The method and apparatus according to the invention may as to their details vary within the scope of the claims.

I claim:

1. Apparatus for providing a single optical fiber with slightly greater length than a sheath extruded thereon, said apparatus comprising an extruder for extrusion of the sheath around the fiber, a coiling device for the sheathed fiber and a stretching device disposed between the extruder and the coiling device for stretching the sheath axially with respect to the fiber, the stretching device comprising:

a drive motor;

a stretch wheel for locking the fiber to the sheath and for moving the fiber toward the coiling device;

a belt drawing device driven by said drive motor at a constant predetermined speed, the belt drawing device being positioned between the extruder and the stretch wheel for moving the sheath toward the stretch wheel at a predetermined speed while permitting relative movement between the sheath and the fiber;

a planetary gear system comprising a ring gear connected to the belt drawing device, a planet gear carrier connected to the stretch wheel, and a small sun gear; and a control motor driving the sun gear at a predetermined low speed such that the stretch wheel moves the sheathed fiber at a slightly higher speed than that at which the drawing device moves the sheath, the speed of the control motor being variable to enable variation of the speed at which the stretch wheel moves the sheathed fiber.

* * * * *